United States Patent
Otosaka (10) Patent No.: US 11,370,692 B2
(45) Date of Patent: Jun. 28, 2022

(54) FABRICATION METHOD AND FABRICATION APPARATUS FOR POROUS GLASS BASE MATERIAL FOR OPTICAL FIBER

(71) Applicant: Shin-Etsu Chemical Co., Ltd., Tokyo (JP)

(72) Inventor: Tetsuya Otosaka, Gunma (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 29 days.

(21) Appl. No.: 16/695,184

(22) Filed: Nov. 26, 2019

(65) Prior Publication Data

US 2020/0095156 A1 Mar. 26, 2020

Related U.S. Application Data

(62) Division of application No. 16/150,277, filed on Oct. 3, 2018, now Pat. No. 10,501,362.

(30) Foreign Application Priority Data

Oct. 13, 2017 (JP) .............................. JP2017-199690

(51) Int. Cl.
*C03B 37/018* (2006.01)
*C03B 37/014* (2006.01)

(52) U.S. Cl.
CPC .... *C03B 37/01815* (2013.01); *C03B 37/0142* (2013.01); *C03B 37/01486* (2013.01);
(Continued)

(58) Field of Classification Search
None
See application file for complete search history.

(56) References Cited

U.S. PATENT DOCUMENTS

| 4,568,370 A | 2/1986 | Powers |
| 4,676,814 A | 6/1987 | Dieter |

(Continued)

FOREIGN PATENT DOCUMENTS

| CN | 1951848 A | 4/2007 |
| CN | 101665322 A | 3/2010 |

(Continued)

OTHER PUBLICATIONS

JP 03-295827, abstract, Emori et al., Production of Optical Fiber Base Material, Dec. 1991. (Year: 1991).*

(Continued)

*Primary Examiner* — Queenie S Dehghan (57) ABSTRACT

According to a fabrication method for fabricating a porous glass base material for optical fiber, the orientation of a clad forming burner used to form the outermost layer of a clad-corresponding portion is changed further upward while glass fine particles are deposited during the period between a first timing and a second timing. At the first timing, the outer diameter of the porous glass base material for optical fiber has not reached a target outer diameter. The second timing is later than the first timing, and either a timing at which the outer diameter of the porous glass base material for optical fiber reaches the target outer diameter for the first time, or a timing prior to this timing.

7 Claims, 4 Drawing Sheets

(52) U.S. Cl.
CPC .... *C03B 37/01884* (2013.01); *C03B 2207/50* (2013.01); *C03B 2207/62* (2013.01); *C03B 2207/64* (2013.01); *C03B 2207/66* (2013.01); *C03B 2207/70* (2013.01)

(56) References Cited

U.S. PATENT DOCUMENTS

| | | | |
|---|---|---|---|
| 6,012,305 | A | 1/2000 | Kuwabara |
| 2007/0084248 | A1* | 4/2007 | Kim ............... C03B 37/0142 65/384 |
| 2010/0050696 | A1 | 3/2010 | Yamada |
| 2012/0103023 | A1 | 5/2012 | Ishihara |
| 2013/0025326 | A1 | 1/2013 | Dabby |
| 2014/0083140 | A1 | 3/2014 | Urata |
| 2016/0176749 | A1* | 6/2016 | Terashima ......... C03B 37/0142 65/421 |

FOREIGN PATENT DOCUMENTS

| | | | | |
|---|---|---|---|---|
| CN | 103224319 | A | | 7/2013 |
| JP | S54181111 | U | | 12/1979 |
| JP | S58204833 | A | | 11/1983 |
| JP | S60260433 | A | | 12/1985 |
| JP | S6330339 | A | | 2/1988 |
| JP | 03295827 | A | * | 12/1991 ......... C03B 37/0142 |
| JP | H10114534 | A | | 5/1998 |
| JP | 200063128 | A | * | 2/2000 ......... C03B 37/0142 |
| JP | 2013234078 | A | * | 11/2013 ......... C03B 37/0142 |
| JP | 5697165 | B2 | | 4/2015 |

OTHER PUBLICATIONS

JP 2000-063128, abstract, Yamaguchi et al., Method and Apparatus for Producing Synthetic Quartz Glass, Feb. 2000 (Year: 2000).*
JP 2013234078 machine translation, Urata, Yuhei, Method of Manufacturing Porous Glass Deposit for Optical Fiber, Nov. 2013 (Year: 2013).*
U.S. Appl. No. 16/150,277, filed Oct. 3, 2018, to Tetsuya Otosaka.
Notice of First Office Action for Patent Application No. 201811100615.6, issued by The National Intellectual Property Administration of the People's Republic of China dated May 8, 2021.
Office Action issued for counterpart India Application 201814034389, issued by the Intellectual Property India dated Mar. 7, 2022.

* cited by examiner

FABRICATION METHOD AND FABRICATION APPARATUS FOR POROUS GLASS BASE MATERIAL FOR OPTICAL FIBER

CROSS-REFERENCE TO RELATED APPLICATIONS

This application is a divisional of U.S. patent application Ser. No. 16/150,277, filed on Oct. 3, 2018, which claims priority to Japanese Patent Application No. 2017-199690, filed on Oct. 13, 2017, the contents of each of which are incorporated herein by reference in their entirety.

BACKGROUND

1. Technical Field

The present invention relates to a fabrication method and a fabrication apparatus for a porous glass base material for optical fiber.

2. Related Art

According to the Vapor-phase Axial Deposition (VAD) method, a plurality of synthesizing burners are used to concurrently form a core-corresponding portion and a clad-corresponding portion of a porous glass base material for optical fiber (see Patent Document 1). Patent Document 1: Japanese Patent No. 5697165

According to the fabrication method disclosed in Patent Document 1, the porous glass base material may crack during the initial stage of the deposition of the glass fine particles.

SUMMARY

A first aspect of the present invention provides a fabrication method for fabricating a porous glass base material for optical fiber, in which a core-corresponding portion corresponding to a core of optical fiber is formed by depositing glass fine particles onto a hanging seed rod, and at least a portion of a clad-corresponding portion corresponding to a clad of the optical fiber is formed by depositing glass fine particles onto the core-corresponding portion. Here, the fabrication method includes a period during which, while glass fine particles are being deposited, a gradient of a clad forming burner used to form an outermost layer of the clad-corresponding portion is changed toward a predetermined gradient relative to the porous glass base material for optical fiber from a downward gradient compared with the predetermined gradient.

A second aspect of the present invention provides a fabrication apparatus for fabricating a porous glass base material for optical fiber, including a reaction vessel configured to house therein a hanging seed rod, a core forming burner configured to deposit glass fine particles onto the seed rod to form a core-corresponding portion that is to be formed into a core of optical fiber, a clad forming burner configured to deposit glass fine particles that are to be formed into a clad of the optical fiber, onto the core-corresponding portion to form at least an outermost layer of a clad-corresponding portion that is to be formed into the clad of the optical fiber, a driver configured to change an orientation of the clad forming burner, and a controller configured to control the driver to, while glass fine particles are deposited, change a gradient of the clad forming burner used to form at least the outermost layer of the clad-corresponding portion toward a predetermined gradient relative to the porous glass base material for optical fiber from a downward gradient compared with the predetermined gradient.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
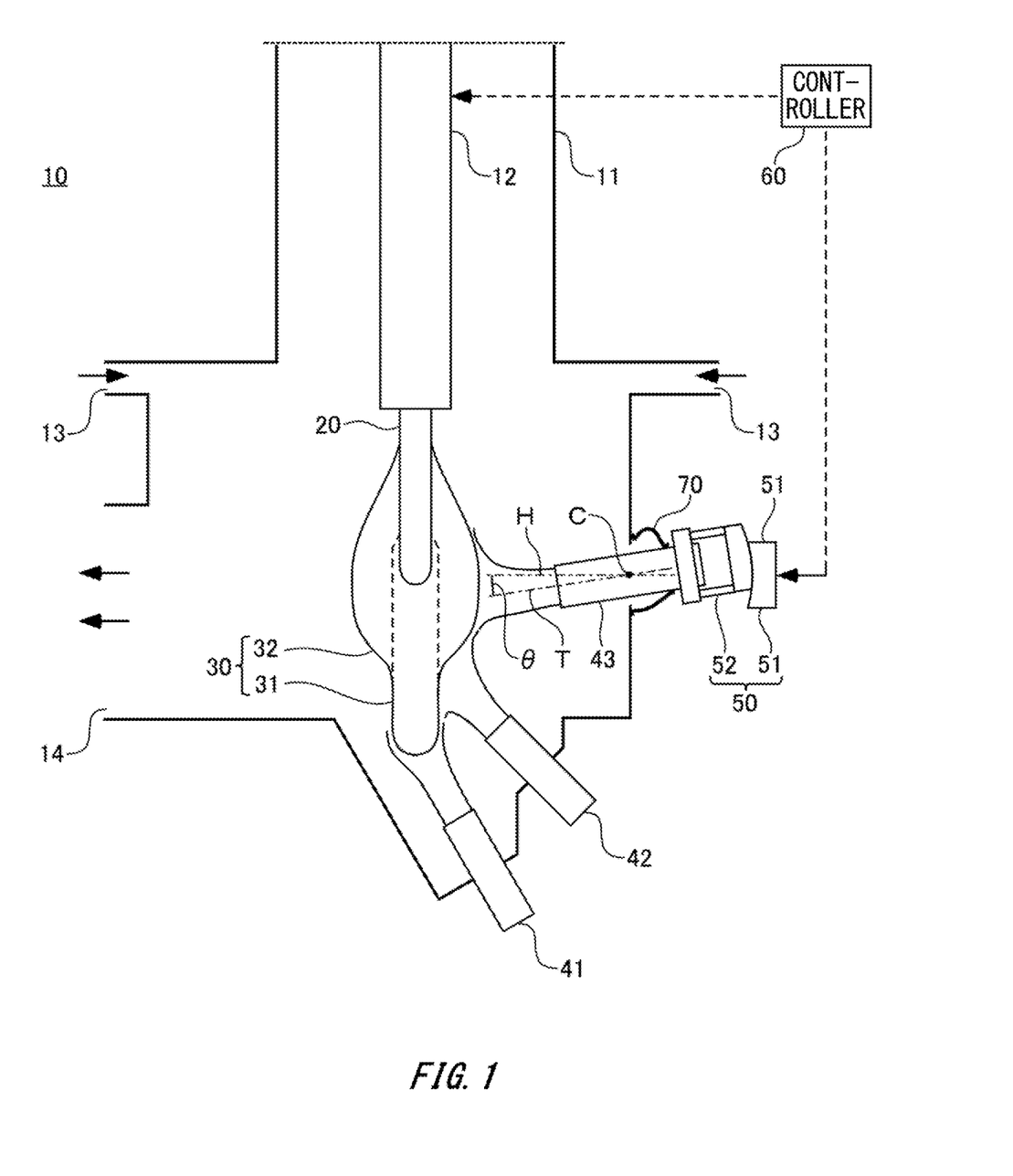
FIG. 1 schematically shows the structure and initial state of a fabrication apparatus 10.

FIG. 1 schematically shows the structure of a fabrication apparatus 10 for fabricating a porous glass base material for optical fiber according to the VAD method. The fabrication apparatus 10 includes a reaction vessel 11, a shaft 12, a core forming burner 41, a core-side-clad forming burner 42 and a surface-side-clad forming burner 43.

The reaction vessel 11 encloses therein the environment in which a porous glass base material is fabricated, in order to prevent the porous glass base material from being contaminated during the fabrication process and to prevent the glass fine particles and the like that are produced during the fabrication process from scattering. In addition, for the purpose of preparing the atmosphere for the formation of the porous glass base material, the reaction vessel 11 has an inlet 13 and an outlet 14.

Through the inlet 13 of the reaction vessel 11, for example, clean air is fed. In this way, clean environment is maintained for fabricating the porous glass base material. Through the outlet 14 of the reaction vessel 11, part of the fed air and the glass fine particles that have been synthesized but not deposited to form the porous glass base material are passed out of the reaction vessel 11. After passed out of the reaction vessel 11, the glass fine particles are collected outside the reaction vessel 11 and thus prevented from scattering into the surrounding environment.

As shown in FIG. 1, the shaft 12 holds the upper end of a seed rod 20 using its lower end to hang the seed rod 20 inside the reaction vessel 11. In addition, while keeping the seed rod 20 hanging, the shaft 12 rotates around the vertical rotation axis and moves up and down together with the seed rod 20. In this way, the seed rod 20, which serves as the target on which the glass fine particles are to be deposited is pulled up as a porous glass base material grows thereon, so that a porous glass base material having a target length can be fabricated.

The core forming burner 41, the core-side-clad forming burner 42, and the surface-side-clad forming burner 43 each spray, into an oxyhydrogen flame, source material gases such as silicon tetrachloride and octamethylcyclotetrasiloxane, which are used as the glass source materials, in order to synthesize glass fine particles. The core forming burner 41 is configured to deposit the synthesized glass fine particles mainly onto the free end of the seed rod 20 and the core-corresponding portion 31 that grows downward from the free end of the seed rod 20.

The core-corresponding portion 31 of the porous glass base material 30 is to be eventually formed into a core portion of optical fiber. Germanium tetrachloride or the like is added to the source material gases fed to the core forming burner 41, as the source material of germanium oxide, which serves as the dopants to raise the refractive index. Furthermore, the core forming burner 41 receives the delivery of silicon tetrachloride serving as the glass source material, a hydrogen gas serving as the combustible gas, an oxygen gas serving as the combustion-supporting gas, a nitrogen gas and an argon gas serving as a seal gas, and the like.

The core-side-clad forming burner 42 is configured to deposit the synthesized glass fine particles mainly onto the lateral surface of the core-corresponding portion 31 that has been deposited by the core forming burner 41. The surface-side-clad forming burner 43 is configured to further deposit the synthesized glass fine particles mainly onto a portion of the clad-corresponding portion 32 that has been deposited by the core-side-clad forming burner 42. The formed porous glass base material 30 is dehydrated and made transparent in a heating furnace in subsequent steps, to be formed into a glass base material.

The clad-corresponding portion 32 of the porous glass base material 30 is eventually formed into a clad portion of optical fiber. Since the clad-corresponding portion 32 is required to have a significantly larger volume than the core-corresponding portion 31, the clad-corresponding portion 32 may be formed by using a plurality of synthesizing burners. In this case, the plurality of synthesizing burners used to form the clad-corresponding portion 32 respectively form different portions of the clad-corresponding portion 32.

According to the shown example, the fabrication apparatus 10 is provided with the core-side-clad forming burner 42 and the surface-side-clad forming burner 43. The core-side-clad forming burner 42 is used to form the inner portion of the clad-corresponding portion 32 that is adjacent to the core-corresponding portion 31. The surface-side-clad forming burner 43 is positioned adjacent to the core-side-clad forming burner 42 and used to form the outer portion defining the surface of the clad-corresponding portion 32. The clad-corresponding portion 32 formed by the core-side-clad forming burner 42 and the clad-corresponding portion 32 formed by the surface-side-clad forming burner 43 are formed into an integrated clad-corresponding portion 32 in the completed porous glass base material 30.

The core-side-clad forming burner 42 and the surface-side-clad forming burner 43 may receive the delivery of silicon tetrachloride serving as the glass source material, a hydrogen gas serving as the combustible gas, an oxygen gas serving as the combustion-supporting gas, an argon gas serving as a seal gas, and the like, without addition of dopants designed to change the refractive index. Alternatively, for the purpose of adjusting the refractive index of the clad portion, a germanium tetrachloride gas, a silicon tetrafluoride gas and the like may be added to the above-mentioned gases.

The fabrication apparatus 10 further includes a driver 50, a controller 60 and a sealing member 70. The driver 50 is arranged outside the reaction vessel 11 and includes an electric goniostage 51 and a burner holder 52. The burner holder 52 holds the vicinity of the back end of the the surface-side-clad forming burner 43. The burner holder 52 is supported by the electric goniostage 51. In this way, when the electric goniostage 51 is operated under the control of the controller 60, the gradient of the surface-side-clad forming burner 43 relative to the horizontal direction changes.

Here, the gradient $\theta$ of the surface-side-clad forming burner 43 is changed by allowing the surface-side-clad forming burner 43 to rotate around the virtual rotation axis C defined by the electric goniostage 51. As shown in FIG. 1, in the fabrication apparatus 10, the electric goniostage 51 defines the virtual horizontal rotation axis C for the surface-side-clad forming burner 43 at the position overlapping the wall surface of the reaction vessel 11.

In this way, the displacement of the surface-side-clad forming burner 43 that accompanies the change in the gradient $\theta$ is the smallest at the position at which the surface-side-clad forming burner 43 intersects with the wall surface of the reaction vessel 11. This can reduce the size of the through hole that is formed in the wall surface of the reaction vessel 11 to allow the surface-side-clad forming burner 43 to penetrate through the wall surface of the reaction vessel 11.

As the electric goniostage 51 is used to constitute the driver 50, the controller 60 can perform electrical control to change the gradient $\theta$ of the surface-side-clad forming burner 43 in accordance with the change in the duration of the deposition or the pulled-up distance. This can make it easy to automate the control of the gradient of the surface-side-clad forming burner 43, which will be mentioned later.

In the fabrication apparatus 10, the sealing member 70 provides airtight seal between the outside of the wall surface of the reaction vessel 11 and the surface of the surface-side-clad forming burner 43. The sealing member 70 has a tubular shape as a whole, and one of the ends firmly adhere to the outer surface of the reaction vessel 11 and the other end firmly adhere to the outer surface of the surface-side-clad forming burner 43.

The sealing member 70 may be formed using a flexible material having a high heatproof temperature, for example, silicon rubber. In this way, even if the change in the gradient $\theta$ causes a change in the position of the surface-side-clad forming burner 43 relative to reaction vessel 11, the inside of the reaction vessel 11 can be disconnected from the surrounding atmosphere since the sealing member 70 can deform while maintaining the airtightness of the reaction vessel 11.

In the fabrication apparatus 10, the virtual rotation axis C of the surface-side-clad forming burner 43 is positioned so as to lie in the wall surface of the reaction vessel 11. In this way, there is only a small change in the position of the surface-side-clad forming burner 43 relative to the reaction vessel 11, which can reduce the amount of the deformation of the sealing member 70 caused by the change in gradient $\theta$. This allows the sealing member 70 to achieve improved durability and makes it easy to maintain the airtightness of the reaction vessel 11.

When the porous glass base material 30 is fabricated using the above-described fabrication apparatus 10, part of the glass fine particles synthesized by the core-side-clad forming burner 42 may be deposited to form the porous glass base material 30 outside the flame of the core-side-clad forming burner 42. Such glass fine particles may form a low-density portion. When the shaft 12 is pulled up so that the porous glass base material 30 is moved upward in the drawing, the low-density portion thus formed is heated by the flame of the surface-side-clad forming burner 43 and resultantly has a higher density.

In the fabrication apparatus 10, the setting conditions such as the gradient and positioning of the core forming burner 41 are determined based on the target specifications of the core-corresponding portion 31 of the porous glass base material 30 to be fabricated. Since the inner portion of the clad-corresponding portion 32 is directly formed on the surface of the core-corresponding portion 31, the setting conditions of the core-side-clad forming burner 42 also largely depend on the setting conditions of the core forming burner 41 and the like.

On the other hand, the setting conditions of the surface-side-clad forming burner 43 are not particularly limited in any aspects except for that high deposit efficiency of the glass fine particles is required. Here, the deposit efficiency of the glass fine particles denotes the ratio of the glass fine particles deposited to form the porous glass base material 30 to all the glass fine particles synthesized by the synthesizing burners.

While the porous glass base material 30 is fabricated using the fabrication apparatus 10, the outer diameter of the porous glass base material 30 significantly varies during the initial stage of the deposition of the glass fine particles. Therefore, in order to keep the above-described process of forming the porous glass base material 30 successfully proceeding, the appropriate setting conditions of the surface-side-clad forming burner 43 may vary during the fabrication process of the porous glass base material 30.

For example, the porous glass base material 30 may crack when the low-density portion that is formed outside the flame of the core-side-clad forming burner 42, that is, formed at low temperatures is heated by the flame of the surface-side-clad forming burner 43. Such a crack in the porous glass base material 30 may occur during the initial stage of the deposition of the glass fine particles onto the seed rod 20 and is referred to as an initial-stage crack. If an initial-stage crack occurs, it is required to restart the fabrication process of the porous glass base material 30 from the beginning, which lowers the yield and productivity.

Even if an initial-stage crack does not occur and the fabrication process of the porous glass base material 30 thus successfully proceeds, the outer diameter of the porous glass base material may be unstable during the initial stage of the fabrication process during which the initial-stage crack can occur. If there is variation in the outer diameter of the porous glass base material 30, the ratio of the core-corresponding portion 31 to the clad-corresponding portion 32 in the porous glass base material 30 is unstable and the porous glass base material 30 cannot be used as an optical fiber base material. Thus, it takes a lot of time until the fabrication apparatus 10 can successively fabricate porous glass base materials 30 that stably have a target outer diameter, which lowers the productivity of the porous glass base materials.

To address this issue, the fabrication apparatus 10 is configured to be capable of changing the gradient θ of the surface-side-clad forming burner 43. With such a configuration, until porous glass base materials 30 can stably have a target outer diameter, the gradient θ is changed to appropriately adjust the setting conditions of the surface-side-clad forming burner 43 so that the initial-stage crack and the variation in the outer diameter can be reduced. As shown in FIG. 1, the gradient θ of the surface-side-clad forming burner 43 is denoted as the angle of the central axis T of the surface-side-clad forming burner 43 with respect to the horizontal plane H.

FIG. 1 also shows the state that can be observed during the relatively initial stage of the deposition of the glass fine particles in the fabrication apparatus 10. During this stage, even the largest portion of the porous glass base material 30 does not yet have the target outer diameter. A first timing during the fabrication process of the porous glass base material 30 is set within this period during which the outer diameter of the porous glass base material 30 has not reached the target outer diameter.

Here, the first timing is such a timing that the ejection port of the surface-side-clad forming burner 43 from which the flame is ejected starts to face upward relative to the horizontal plane H. The first timing may be the timing at which the surface-side-clad forming burner 43 starts to deposit the glass fine particle or a timing subsequent to this timing. Note that, however, the first timing is positioned before the gradient θ of the surface-side-clad forming burner 43 is fixed and the deposition to form the porous glass base material 30 can be performed under steady conditions.

At the first timing, the surface-side-clad forming burner 43 has such a gradient θ that the ejection port of the surface-side-clad forming burner 43 faces downward relative to the horizontal plane H. In other words, the gradient θ of the surface-side-clad forming burner 43 is a negative angle relative to the horizontal plane H.

When the core forming burner 41, the core-side-clad forming burner 42 and the surface-side-clad forming burner 43 are ignited at the first timing to start the synthesis of the glass fine particles and the deposition of the glass fine particles onto the seed rod 20, the gradient θ of the surface-side-clad forming burner 43 is, for example, −10° at the first timing. In this way, the flame ejected from the surface-side-clad forming burner 43 becomes continuous with the flame from the core-side-clad forming burner 42 on the surface of the porous glass base material 30 that still has a small diameter.

Here, the source material gases may be fed to the core forming burner 41 and the core-side-clad forming burner 42 at the same timing, in which case the seed rod 20 starts to be pulled up at the same timing. However, the source material gases may be fed to the core forming burner 41 and the core-side-clad forming burner 42 at different timings. The source material gases may be fed to the surface-side-clad forming burner 43 so that the surface-side-clad forming burner 43 can start the deposition of the glass fine particles at a later timing than the timing for the other burners, for example, approximately one hour later. Therefore, the above-mentioned first timing may be determined based on the timing at which the surface-side-clad forming burner 43 is to be ignited.

During the initial stage of the deposition of the glass fine particles in the fabrication apparatus 10, the amounts of the gases ejected from the respective burners may be reduced since the glass fine particles are deposited onto a thin seed rod 20. The amounts of the gases ejected may be gradually increased as the duration of the deposition elapses or the distance by which the shaft 12 pulls up the seed rod 20 increases or the like, during the period lasting until the outer diameter of the porous glass base material 30 being formed reaches the target outer diameter so that the glass fine particles can be deposited under steady conditions.

Figure 2:
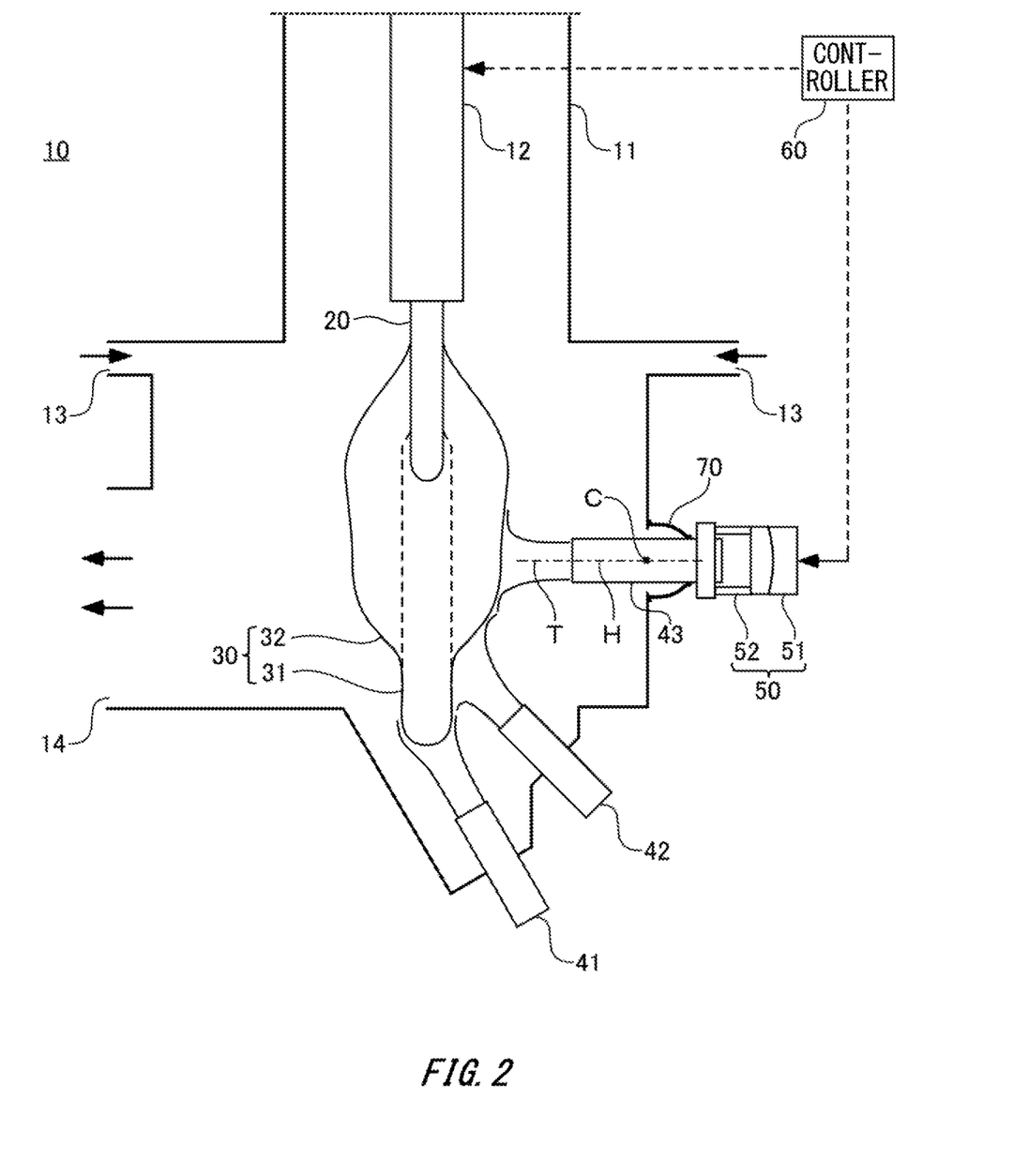
FIG. 2 schematically shows the state of the fabrication apparatus 10 that can be observed after the deposition starts.

FIG. 2 shows a different stage during the fabrication process of the porous glass base material 30 using the fabrication apparatus 10. The porous glass base material 30 being formed has significantly grown compared with the state shown in FIG. 1 but the outer diameter of the porous glass base material 30 has not yet reached the target outer diameter. Compared with the state shown in FIG. 1, the porous glass base material 30 has been pulled up to a higher position through the seed rod 20 and the shaft 12 of the fabrication apparatus 10.

Furthermore, when the fabrication apparatus 10 is in the state shown in FIG. 2, as the surface-side-clad forming burner 43 has been driven by the driver 50, the ejection port of the surface-side-clad forming burner 43 has rotated to be generally coplanar with the horizontal plane H so that the gradient θ is approximately 0. At this stage, the intersection angle between the direction in which the flame is ejected from the core-side-clad forming burner 42 and the direction in which the flame is ejected from the surface-side-clad forming burner 43 is relatively small. Since the porous glass base material 30 has grown to have a large outer diameter, however, the flame of the core-side-clad forming burner 42 is continuous with the flame of the surface-side-clad forming burner 43 on the surface of the porous glass base material 30 and there is thus no gap between the flames.

Figure 3:
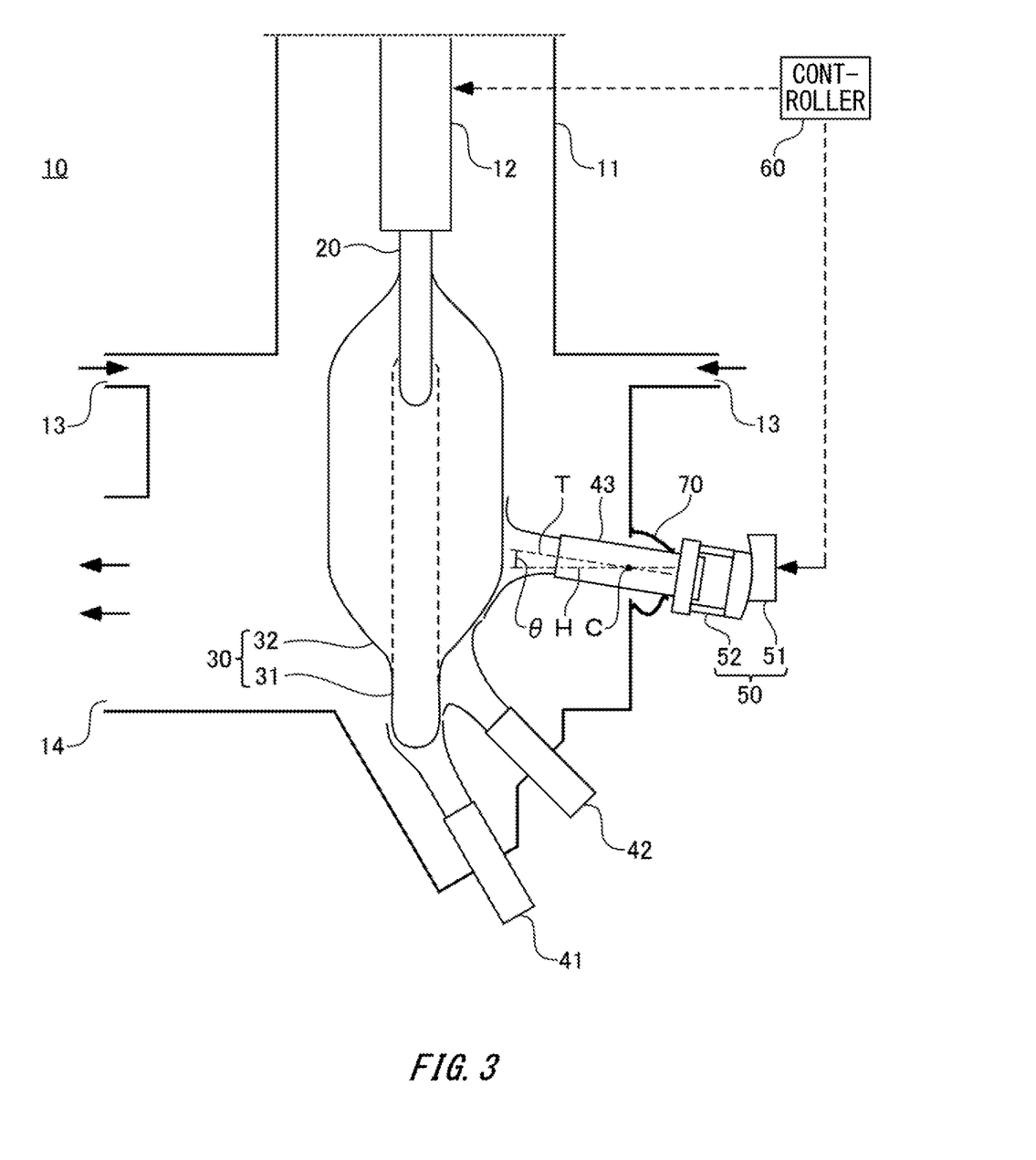
FIG. 3 schematically shows a different state of the fabrication apparatus 10 that can be observed after deposition starts.

FIG. 3 shows a further subsequent stage during the fabrication process of the porous glass base material 30 using the fabrication apparatus 10. Compared with the state shown in FIG. 2, the porous glass base material 30 has been further pulled up by the shaft 12 of the fabrication apparatus 10. Also, the outer diameter of the porous glass base material 30 being formed has reached the target outer diameter. This means that an effective portion that can be used as optical fiber base material has already started to be formed. The effective portion is a continuous portion having a constant target outer diameter.

When the fabrication apparatus 10 is in the state shown in FIG. 3, the deposition of the glass fine particles by the surface-side-clad forming burner 43 starts to form the effective portion of the porous glass base material 30 that continuously have a constant target outer diameter. Accordingly, the fabrication apparatus 10 is in the steady state, in which the fabrication apparatus 10 can grow the porous glass base material 30 having a constant outer diameter in the length direction. This means that a second timing during the fabrication process of the porous glass base material 30 using the fabrication apparatus 10 has been already passed.

Here, the second timing is later than the first timing and determined in advance in accordance with the target outer diameter of the porous glass base material 30 to be fabricated. For example, varying the angle of the surface-side-clad forming burner 43 is stopped 200 minutes after the start, after which the conditions such as the source material gases fed to the surface-side-clad forming burner 43 are kept unchanged. In addition, the rate at which the seed rod 20 is pulled up is also kept constant. For the reasons stated above, the second timing may be defined as the timing at which the conditions for the formation of the porous glass base material 30 being fabricated become constant.

At the second timing, changing the orientation of the ejection port of the surface-side-clad forming burner 43 further upward, that is, increasing the gradient θ relative to the horizontal plane H in the positive direction is stopped and the gradient θ of the surface-side-clad forming burner 43 is fixed. In other words, in the fabrication apparatus 10, during the period from the above-described first timing to the above-described second timing, the orientation of the ejection port of the surface-side-clad forming burner 43 is changed further upward, that is, the gradient θ relative to the horizontal plane H is increased in the positive direction while the glass fine particles are deposited.

Here, the gradient θ of the surface-side-clad forming burner 43 may be changed in a continuous or stepwise manner. In particular, when a stepping motor is used as the driver, the gradient θ is unavoidably changed in a stepwise manner. If the change occurs in sufficiently small steps, however, there are hardly differences between the stepwise changes and continuous changes. When the change occurs in excessively large steps, on the other hand, the surface of the porous glass base material 30 being fabricated experiences a sudden change in temperature, which may cause cracks and the like.

Since the state shown in FIG. 3 can be observed after the second timing has been passed, the gradient θ of the surface-side-clad forming burner 43 is fixed to a value realizing the orientation corresponding to the steady state. In the shown example, the orientation of the surface-side-clad forming burner 43 is slightly upward. In this case, the direction in which the flame is ejected from the core-side-clad forming burner 42 is further moved away from the direction in which the flame is ejected from the surface-side-clad forming burner 43. Since the outer diameter of the porous glass base material 30 has grown to be sufficiently large, however, the flame of the core-side-clad forming burner 42 is continuous with the flame of the surface-side-clad forming burner 43 on the surface of the porous glass base material 30 so that there is no gap between the flames.

The gradient θ of the surface-side-clad forming burner 43 used subsequent to the second timing is determined in advance based, for example, on the target outer diameter of the porous glass base material 30. Here, even after changing the gradient θ of the surface-side-clad forming burner 43 is stopped, the synthesis of the glass fine particles by the core forming burner 41, the core-side-clad forming burner 42 and the surface-side-clad forming burner 43 continues so that the porous glass base material 30 continues growing in the longitudinal direction. In this way, the porous glass base material 30 continues to be formed until the effective portion of the porous glass base material 30 that has a constant outer diameter reaches a target length.

According to the example shown in FIGS. 1 to 3, the fabrication apparatus 10 keeps the orientation of the surface-side-clad forming burner 43 downward during the initial stage of the fabrication process of the porous glass base material 30 so as to reduce the gap between the flame of the core-side-clad forming burner 42 and the flame of the surface-side-clad forming burner 43 on the surface of the porous glass base material 30 and avoid a gap from being formed between the flames. This can reduce the formation of the low-density portion in the porous glass base material 30, thereby preventing the initial-stage crack from occurring.

The fabrication apparatus 10 forms the porous glass base material 30 while keeping the flame of the core-side-clad forming burner 42 continuous with the flame of the surface-side-clad forming burner 43 on the surface of the porous glass base material 30. In this way, the low-density portion, which may possibly be formed in the porous glass base material 30 by the core-side-clad forming burner 42, can be immediately heated by the surface-side-clad forming burner 43 and can accomplish a high density. Consequently, the formation of the low-density portion can be further reduced.

In other words, when the porous glass base material 30 is fabricated using the fabrication apparatus 10, the gradient θ of the surface-side-clad forming burner 43 is preferably changed, as the formation of the porous glass base material 30 proceeds, within such a range that the flame ejected from the surface-side-clad forming burner 43 is always kept continuous with the flame ejected from the core-side-clad forming burner 42 on the surface of the porous glass base material 30. This can prevent the initial-stage crack from occurring in the porous glass base material 30 being formed.

In combination with controlling the gradient θ of the surface-side-clad forming burner 43 in the above-described manner, the amounts of the gases ejected from the respective burners may be regulated for the purposes of reducing the initial-stage crack. Specifically speaking, in order to reduce the initial-stage crack, the amounts of the gases ejected from the respective burners may be set low during the initial stage of the deposition of the glass fine particles and increased at a controlled rate until the outer diameter of the porous glass base material 30 being formed reaches the target outer diameter so that the glass fine particles can be deposited under steady conditions.

Figure 4:
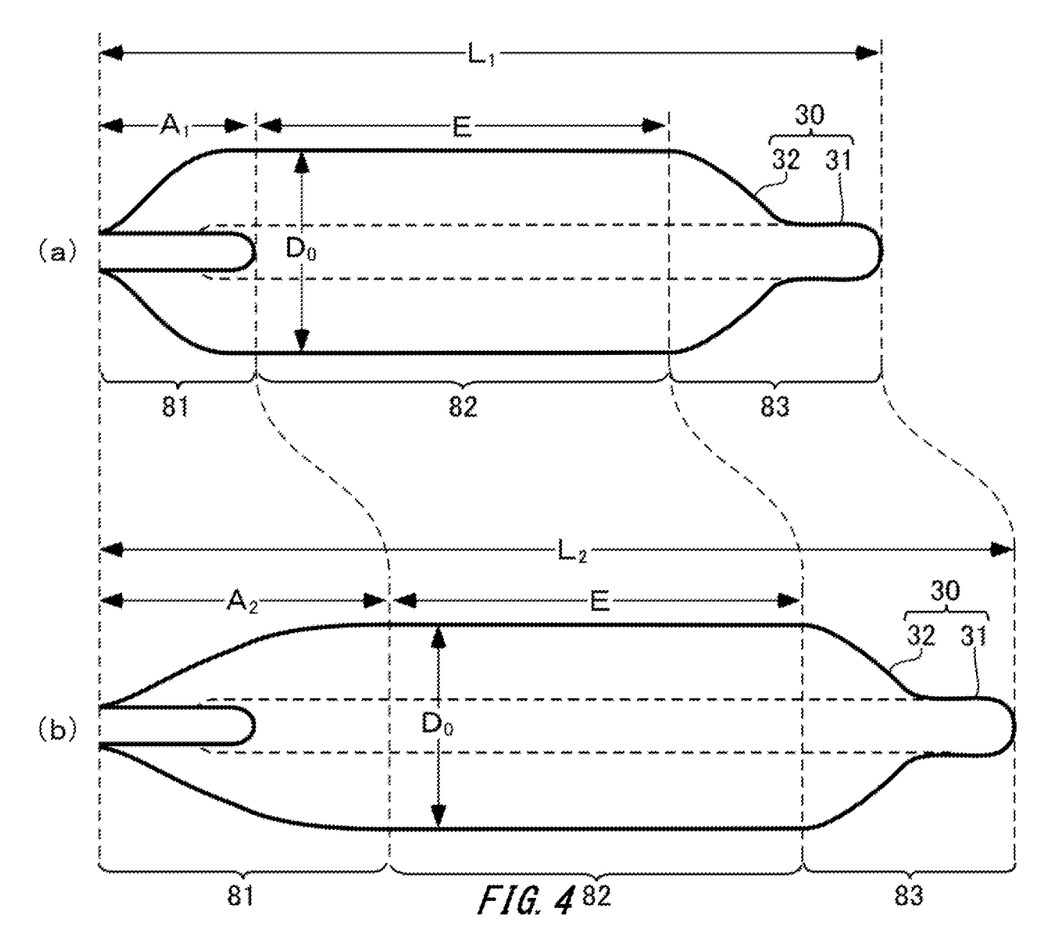
FIG. 4 shows the ratio of an effective portion 82 to a porous glass base material 30.

FIG. 4 is used to describe the shape of the porous glass base material fabricated using the fabrication apparatus 10. FIG. 4 also compares the shapes of the porous glass base materials 30 fabricated in two different methods using the fabrication apparatus 10.

The porous glass base material 30 shown in the upper section (a) has a non-effective portion 81 that is shown on the left side in the drawing and has a gradually increasing outer diameter, an effective portion 82 that has a substantially constant outer diameter and a non-effective portion 83 that is shown on the right side in the drawing and has a gradually decreasing outer diameter. Here, the non-effective portion 81 is formed during the initial stage of the fabrication process of the porous glass base material 30 using the fabrication apparatus 10 and the non-effective portion 83 is formed during the terminal stage of the fabrication process of the porous glass base material 30.

In the non-effective portions 81 and 83, the ratio of the core-corresponding portion 31 to the clad-corresponding portion 32 varies among the cross-sections orthogonal to the longitudinal direction. Consequently, even if the non-effective portions 81 and 83 are processed into transparent glass and drawn, the non-effective portions 81 and 83 cannot be fabricated into optical fiber. On the other hand, the effective portion 82 has a constant target outer diameter $D_0$ across its entire length E. Therefore, the ratio of the core-corresponding portion 31 to the clad-corresponding portion 32 is constant in every cross-section orthogonal to the longitudinal direction. Consequently, the effective portion 82 can be used as an optical fiber base material that can be fabricated into optical fiber by drawing.

While the porous glass base material 30 shown in the upper section (a) in the drawing is formed by depositing the glass fine particles, the gradient θ of the surface-side-clad forming burner 43 is changed from a negative angle to a positive angle relative to the horizontal plane H. Accordingly, the gradient θ of the surface-side-clad forming burner 43 is a negative angle relative to the horizontal plane H during the initial stage of the deposition of the glass fine particles. This means that the flame of the core-side-clad forming burner 42 is close to the flame of the surface-side-clad forming burner 43. Consequently, at the portion to which the flames are applied, the deposition of the glass fine particles is carried out at a high rate.

In this manner, the outer diameter of the porous glass base material 30 can swiftly reach the target outer diameter. In the example shown, at the position substantially the same as the position at which the core-corresponding portion 31 starts to be formed on the free end of the seed rod 20, the clad-corresponding portion 32 reaches the target outer diameter $D_0$ and the effective portion 82 of the porous glass base material 30 starts to be formed.

The porous glass base material 30 shown in the lower section (b) of the drawing also has a non-effective portion 81 that is formed during the initial stage of the fabrication process, an effective portion 82 formed after the non-effective portion 81, and a non-effective portion 83 that is formed during the terminal stage of the fabrication process. This porous glass base material 30 is formed in such a manner that the gradient θ of the surface-side-clad forming burner 43 is fixed from start to finish during the deposition of the glass fine particles. Here, the fixed value of the gradient θ of the surface-side-clad forming burner 43 is optimized for the formation of the effective portion 82, which is carried out after the outer diameter reaches the target outer diameter $D_0$.

Accordingly, during the formation of the non-effective portion 81, there is a gap between the flame of the core-side-clad forming burner 42 and the flame of the surface-side-clad forming burner 43. For this reason, the glass fine particles are deposited at a low rate, it takes a lot of time until the outer diameter of the porous glass base material 30 reaches the target outer diameter $D_0$, and the length $A_2$ of the initial non-effective portion 81 in the fabricated porous glass base material 30 is resultantly longer than the length $A_1$ of the non-effective portion 81 in the porous glass base material 30 shown in the upper section.

As described above, if the gradient θ of the surface-side-clad forming burner 43 is fixed, it requires a longer time to finally fabricate the porous glass base material 30 having the effective portion 82 of the same length E. Furthermore, it is required to increase the amounts of the materials and fuels to fabricate the porous glass base material 30, and more glass fine particles are not deposited to form the porous glass base material 30 and remain within the reaction vessel 11. Such excess glass fine particles may adhere to the inner surface of the reaction vessel 11 and then come off and fall in the agglomerated form to adhere onto the porous glass base material 30. This may increase the probability of foams in the optical fiber glass base materials.

EXPERIMENTAL EXAMPLE 1

The fabrication apparatus 10 was used to fabricate a porous glass base material 30 having an effective portion with a length E of 1400 mm and a target outer diameter of 250 mm. The gradient θ of the surface-side-clad forming burner 43 was defined to have a positive value when the ejection port of the surface-side-clad forming burner 43 faced upward relative to the horizontal plane H. At the first timing at which the synthesis of the glass fine particles by the surface-side-clad forming burner 43 started, the gradient θ was set to −10°, that is, the ejection port of the surface-side-clad forming burner 43 was controlled to face downward.

In the fabrication apparatus 10, the controller 60 controlled the driver 50 in such a manner that the gradient θ of the surface-side-clad forming burner 43 reached +6° at the second timing by which the shaft 12 had been pulled up by 200 mm. Accordingly, during the period from the state that is shown in FIG. 1 and observed at the first timing to the state that is shown in FIG. 3 and observed at the second timing, the gradient θ of the surface-side-clad forming burner 43 was continuously changed at the rate of 0.08°/mm with respect to the amount by which the shaft 12 was pulled up.

The porous glass base material 30 obtained in the above-described manner had an entire length $L_1$ of 1550 mm, including non-effective portions 81 and 83. This means that the ratio of the length E of the effective portion to the entire length $L_1$ of the porous glass base material 30 was 90.3%.

Under the same settings, 50 porous glass base materials 30 were successively fabricated but none of them had an initial-stage crack. The obtained porous glass base materials 30 were dehydrated and processed into transparent glass in a heating furnace. The resulting 50 porous glass base materials 30 had 0.04 foams on average.

COMPARATIVE EXAMPLE 1

For the purpose of comparison, 50 porous glass base materials 30 were fabricated that had an effective portion with a length E of 1400 mm and a target outer diameter of 250 mm with the gradient θ of the surface-side-clad forming burner 43 being fixed at +6° from start to finish. The porous glass base materials 30 had an entire length $L_2$ of 1700 mm including non-effective portions. Consequently, the ratio of the length E of the effective portion to the entire length $L_2$ of the porous glass base material 30 was 82.4%.

While the 50 porous glass base materials 30 were fabricated, an initial-stage crack occurred three times. The obtained porous glass base materials 30 were dehydrated and processed into transparent glass in a heating furnace. The resulting 50 porous glass base materials 30 had 0.12 foams on average.

As described above, the fabrication apparatus 10 including the surface-side-clad forming burner 43 that has variable orientation was used, and the orientation of the surface-side-clad forming burner 43 was changed during a certain period before the outer diameter of the porous glass base material 30 being formed reached the target outer diameter. In this manner, the outer diameter of the porous glass base material 30 could swiftly reach the target outer diameter and the effective portion could occupy a higher ratio in the resulting porous glass base material 30. As a consequence, the yield per unit of source materials can be improved and, at the same time, the productivity of the optical fiber glass base material can be improved since the period of time required to complete the fabrication is shortened.

If the period of time required to complete the fabrication of the porous glass base material 30 is shortened, the amount of the agglomerated soot can be also reduced. Such agglomerated soot may be formed in such a manner that the glass fine particles adhere to the inner surface of the reaction vessel 11 since they are not deposited to form the porous glass base material 30 in any of the steps of the fabrication process. This leads to reduction in the foams that are produced in the glass base material by the soot that adhere to the porous glass base material 30.

During the initial stage of the deposition to form the clad-corresponding portion 32, which comes before the outer diameter of the porous glass base material 30 reaches the target outer diameter, the orientation of the surface-side-clad forming burner 43 is controlled to be downward, compared with the orientation employed during the steady state which comes after the outer diameter of the porous glass base material 30 reaches the target outer diameter. In this manner, an initial-stage crack can be also reduced during the fabrication process of the porous glass base material 30. As a result, the porous glass base material 30 can achieve the improved yield and the cost of fabricating the optical fiber glass base material can be reduced.

Here, the fabrication apparatus 10 may have three or more clad forming burners. When there are three or more clad forming burners, the synthesizing burner that is designed to form the outermost surface of the clad-corresponding portion 32 may be labeled as the surface-side-clad forming burner 43.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: fabrication apparatus, 11: reaction vessel, 12: shaft, 13: inlet, 14: outlet, 20: seed rod, 30: porous glass base material, 31: core-corresponding portion, 32: clad-corresponding portion, 41: core forming burner, 42: core-side-clad forming burner, 43: surface-side-clad forming burner, 50: driver, 51: electric goniostage, 52: burner, 60: controller, 70: sealing member, 81 and 83: non-effective portion, 82: effective portion

What is claimed is:

1. A fabrication apparatus for fabricating a porous glass base material for optical fiber, comprising:
   a reaction vessel configured to house therein a hanging seed rod;
   a core forming burner configured to deposit glass fine particles onto the seed rod to form a core-corresponding portion that is to be formed into a core of optical fiber;
   two clad forming burners including a surface-side clad forming burner and a core-side clad forming burner configured to deposit glass fine particles that are to be formed into a clad of the optical fiber, onto the core-corresponding portion to form at least an outermost layer of a clad-corresponding portion that is to be formed into the clad of the optical fiber, the core-side clad forming burner being positioned in a vertical direction between the core forming burner and the surface-side clad forming burner;
   a driver configured to change an orientation of the surface-side clad forming burner; and
   a controller configured to control the driver to, while the glass fine particles are deposited by the surface-side clad forming burner, change a gradient of the surface-side clad forming burner used to form at least the outermost layer of the clad-corresponding portion from a negative angle to a positive angle relative to a horizontal plane as formation of the porous glass base material proceeds.

2. The fabrication apparatus for fabricating a porous glass base material for optical fiber as set forth in claim 1, wherein the orientation of the surface-side clad forming burner is changed by rotating the surface-side clad forming burner around a rotation axis that lies in a wall surface of the reaction vessel.

3. The fabrication apparatus for fabricating a porous glass base material for optical fiber as set forth in claim 1, further comprising a tubular sealing member that firmly adheres to the reaction vessel at one end thereof and firmly adheres to the surface-side clad forming burner at the other end thereof, the sealing member being configured to provide airtight seal between the reaction vessel and the surface-side clad forming burner.

4. The fabrication apparatus for fabricating a porous glass base material for optical fiber as set forth in claim 1, wherein the driver is positioned outside the reaction vessel.

5. The fabrication apparatus for fabricating a porous glass base material for optical fiber as set forth in claim 1, wherein the driver includes an electric goniostage.

6. The fabrication apparatus for fabricating a porous glass base material for optical fiber as set forth in claim 1, wherein the controller is further configured to control the driver to face the surface-side clad forming burner downward relative to the horizontal plane at a start of the deposit of the glass fine particles by the surface-side clad forming burner.

7. The fabrication apparatus for fabricating a porous glass base material for optical fiber as set forth in claim 6, wherein the controller is further configured to control the gradient of the surface-side clad forming burner to go beyond the horizontal plane before an outer diameter of the porous glass base material reaches a target outer diameter of the porous glass base material.

\* \* \* \* \*